Figure 1:
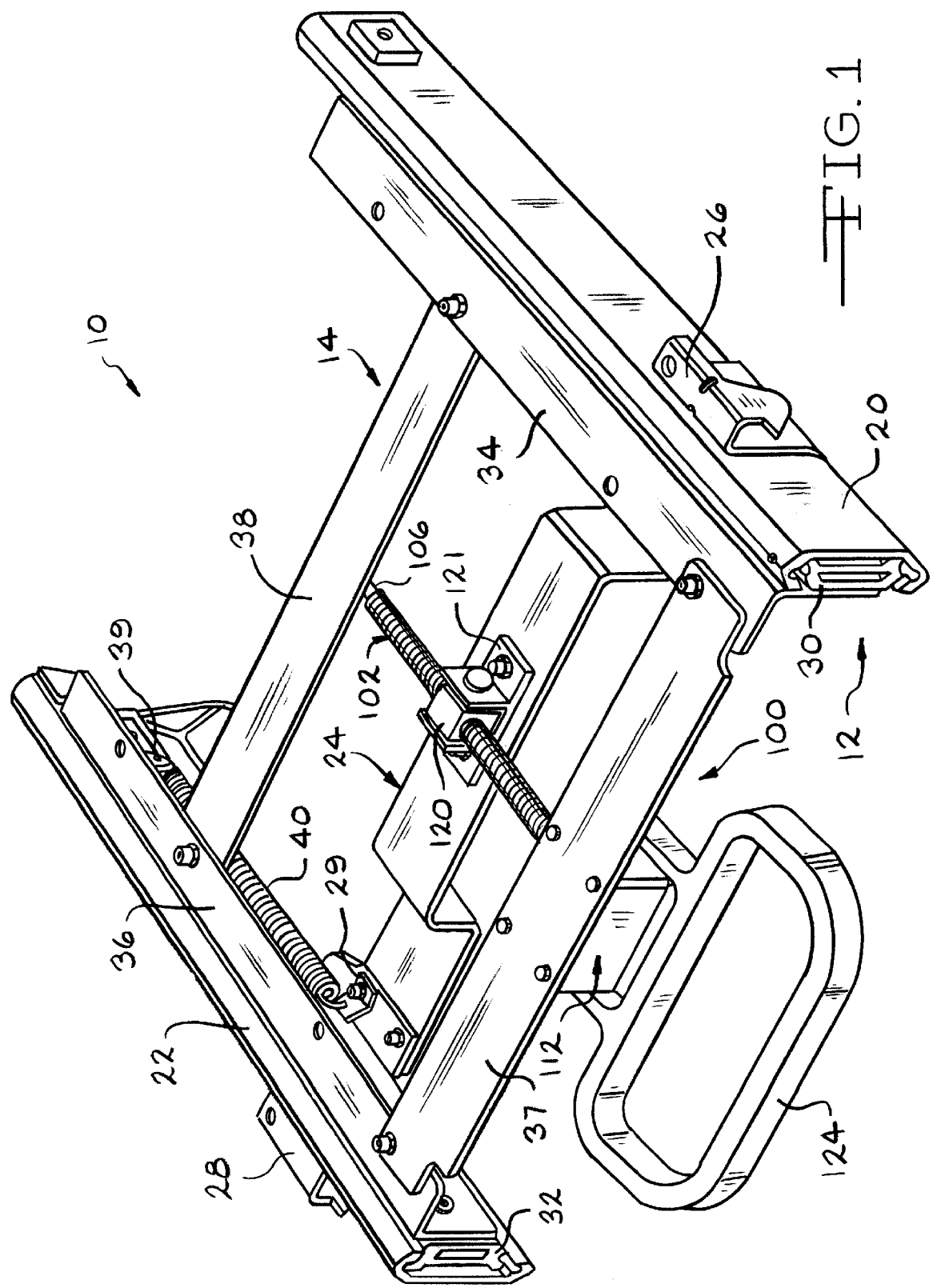

United States Patent

Bernhardt et al.

[11] Patent Number: 6,131,871
[45] Date of Patent: Oct. 17, 2000

[54] MANUALLY ACTUATED SEAT ADJUSTER

[75] Inventors: Donald H. Bernhardt, Walled Lake; Mark A. Farquhar, Ortonville; Kirk P. Koening, Waterford; Michael P. Sherry, Fenton, all of Mich.

[73] Assignee: Lear Automotive Dearborn, Inc, Southfield, Mich.

[21] Appl. No.: 09/074,039

[22] Filed: May 7, 1998

[51] Int. Cl.[7] .................................................. F16M 13/00
[52] U.S. Cl. ........................... 248/424; 248/429; 297/341
[58] Field of Search ................................... 248/424, 429, 248/422; 297/341

[56] References Cited

U.S. PATENT DOCUMENTS

| 3,076,629 | 2/1963 | Henry-Biabaud | 248/424 |
|---|---|---|---|
| 4,770,386 | 9/1988 | Hessler et al. | 248/393 |
| 4,799,734 | 1/1989 | Périou | 297/361 |
| 4,842,234 | 6/1989 | Koch | 248/429 |
| 4,898,356 | 2/1990 | Pipon et al. | 248/429 |
| 4,966,045 | 10/1990 | Harney | 74/424.8 A |
| 5,447,352 | 9/1995 | Ito et al. | 248/424 X |
| 5,473,958 | 12/1995 | Jeck et al. | 74/89.15 |
| 5,567,013 | 10/1996 | Chang | 297/341 |
| 5,568,908 | 10/1996 | Kisiel | 248/419 |
| 5,607,032 | 3/1997 | Rees | 188/67 |
| 5,613,733 | 3/1997 | Miller, Sr. et al. | 297/344.1 |
| 5,622,406 | 4/1997 | Meschkat et al. | 297/318 |
| 5,634,537 | 6/1997 | Thorn | 188/300 |
| 5,641,145 | 6/1997 | Droulon et al. | 248/429 |
| 5,727,768 | 3/1998 | Sakamoto | 248/429 |
| 5,873,588 | 2/1999 | Sakamoto | 248/429 |

*Primary Examiner*—Anita M. King
*Attorney, Agent, or Firm*—MacMillan, Sobanski & Todd, LLC; A. Michael Tucker

[57] ABSTRACT

A seat bottom fame assembly providing a support surface for a vehicular seat includes first and second track assemblies. The first track assembly is fixedly secured to a floor of a passenger compartment. The second track assembly is slidingly connected to the first track assembly. A manually actuated seat adjuster is attached to the first and second track assemblies to permit selective sliding of the second track assembly with respect to the first track assembly. The manually actuated seat adjuster includes a rotatable driveshaft having first and second ends. A drive nut is threadingly engaged with the driveshaft between the first and second ends. A first element is fixedly secured to the first end of the driveshaft. A second element is rotatably mounted on the first end of the driveshaft and selectively engaged with the first element. An actuation member is operatively connected to the second element to selectively disengage the second element from the first element to permit rotation of the driveshaft within the drive nut. The actuation member also selectively engages the second element with the first element to prevent rotation of the driveshaft within the drive nut.

16 Claims, 9 Drawing Sheets

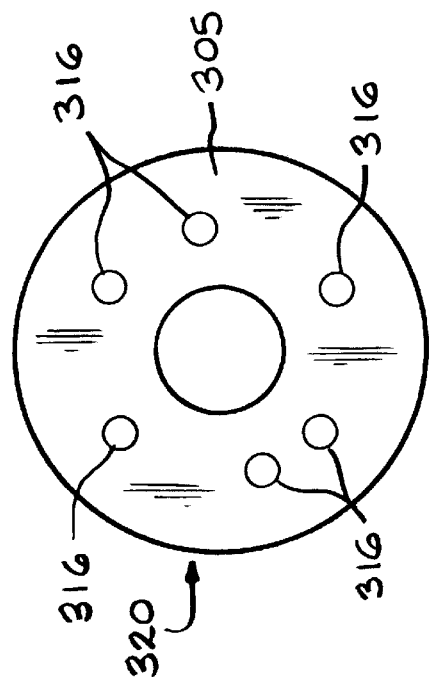
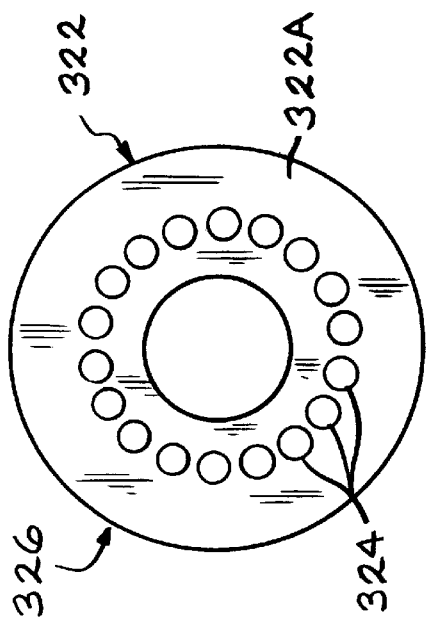
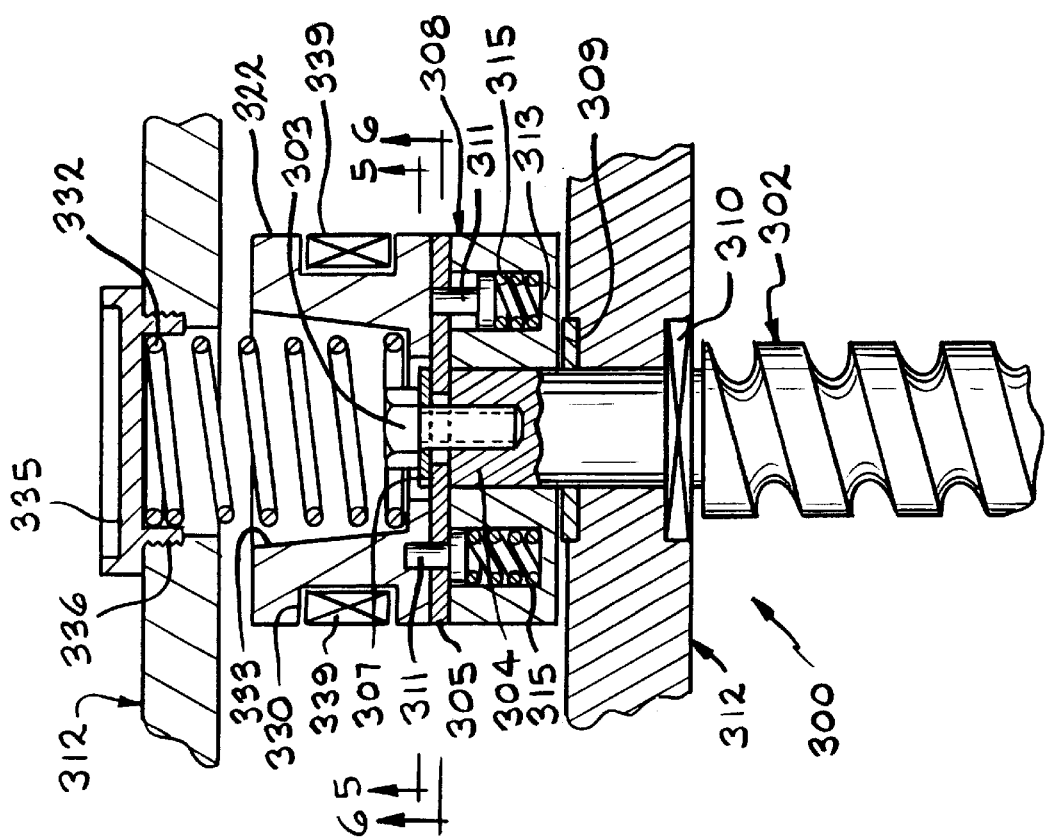

MANUALLY ACTUATED SEAT ADJUSTER

BACKGROUND OF THE INVENTION

This invention relates in general to seats for passenger vehicles, and in particular is concerned with a manually actuated seat adjuster.

A common seat system for a passenger compartment of an automobile includes a front driver bucket seat, a front passenger bucket seat, and a rear passenger bench seat. Each of the bucket seats includes a seat bottom and a seat back. A seat back is usually hinged to a seat bottom and can be pivoted forward to allow access to the rear bench seat. The seat bottom can be mounted on a track assembly to permit a seat to be adjusted along a longitudinal axis for comfort of an occupant and access to the rear seat.

Seat adjusters are provided to adjust the position of the seat with respect to a floor of a passenger compartment. Manually actuated seat adjusters rely on a force from a user to unlock the position of a seat and permit a seat to be positioned as desired. Power actuated seat adjusters usually rely on an electric motor to provide the force to move a seat as desired. Seat adjusters cooperate with a seat bottom to move the seat assembly as desired.

It is desirable to provide a reliable and cost effective manually actuated seat adjuster for a vehicular seat. Furthermore, it is desirable to provide a manually actuated seat adjuster attached to a seat bottom frame assembly to permit a vehicular seat to be positioned as desired.

SUMMARY OF THE INVENTION

This invention includes a manually actuated seat adjuster for a vehicular seat. The seat adjuster is attached to a seat bottom frame assembly and permits a vehicular seat to be positioned as desired. The seat adjuster includes a rotatable screw driveshaft that permits a seat to be positioned as desired along the length of the driveshaft. The seat adjuster is economical to manufacture and provides a reliable means for adjusting the position of a seat along a longitudinal axis.

In a preferred embodiment, a seat bottom frame assembly providing a support surface for a vehicular seat includes first and second track assemblies. The first track assembly is fixedly secured to a floor of a passenger compartment. The second track assembly is slidingly connected to the first track assembly. A manually actuated seat adjuster is attached to the first and second track assemblies to permit selective sliding of the second track assembly with respect to the first track assembly. The manually actuated seat adjuster includes a rotatable driveshaft having first and second ends. A drive nut is threadingly engaged with the driveshaft between the first and second ends. A first element is fixedly secured to the first end of the driveshaft. A second element is rotatably mounted on the first end of the driveshaft and selectively engaged with the first element. An actuation member is operatively connected to the second element to selectively disengage the second element from the first element to permit rotation of the driveshaft within the drive nut. The actuation member also selectively engages the second element with the first element to prevent rotation of the driveshaft within the drive nut.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a perspective view of a first embodiment of a manually actuated seat adjuster according to this invention mounted on a seat bottom frame assembly.

FIG. 2 is an exploded perspective view of the manually actuated seat adjuster illustrated in FIG. 1 wherein the seat bottom frame assembly has been removed for clarity of illustration FIG. 3 is a perspective view of a portion of a second embodiment of a manually actuated seat adjuster according to this invention wherein a section has been removed for clarity of illustration.

FIG. 4 is a sectional view of a portion of a third embodiment of a manually actuated seat adjuster according to this invention illustrating a pin housing secured to a driveshaft by a fastener.

FIG. 5 is a sectional view taken along line 5—5 of FIG. 4 illustrating a pin pattern.

FIG. 6 is a sectional view taken along line 6—6 of FIG. 4 illustrating a hole pattern for receiving the pin pattern of FIG. 5.

FIG. 7 is a perspective view of a portion of a fourth embodiment of a manually actuated seat adjuster according to this invention wherein a section has been removed to illustrate a pin housing secured to a driveshaft by a splined portion.

FIG. 8 is an exploded perspective view of portion of a fifth embodiment of a manually actuated seat adjuster according to this invention illustrating a gear set and bearing assembly.

FIG. 9 is a sectional view of the assembled manually actuated seat adjuster of FIG. 8.

FIG. 10 is a sectional view taken along line 10—10 of FIG. 9 illustrating a counterweight and lever placed in a housing near a counterclockwise gear.

FIG. 11 is a sectional view taken along line 11—11 of FIG. 9 illustrating a counterweight and lever placed inside a housing near a clockwise gear.

FIG. 12 is a perspective view of the counterweight, lever, and counterclockwise gear of FIG. 10.

DETAILED DESCRIPTION OF THE PREFERRED EMBODIMENTS

A seat bottom frame assembly according to this invention is indicated generally at 10 in FIG. 1. The seat bottom frame assembly 10 provides a support surface for a vehicular seat assembly (not illustrated), particularly a bucket seat commonly found in passenger vehicles. The seat bottom frame assembly 10 permits a mounted seat assembly to be manually adjusted along a longitudinal axis for the convenience and comfort of an occupant.

The seat bottom frame assembly 10 includes a first or lower track assembly 12 and a second or upper track assembly 14. The lower track assembly 12 is fixedly secured to a floor of a passenger compartment of a vehicle. The upper track assembly 14 is slidably mounted on the lower track assembly 12 and can be positioned as desired along a longitudinal axis of a vehicle. A user applies a force to a seat assembly mounted on the upper track assembly 14 to position the upper track assembly 14 as desired.

The lower track assembly 12 includes a first side channel 20 and a second side channel 22 arranged in parallel fashion to each another. Each of the channels 20 and 22 preferably has a generally C-shaped cross section. Each of the channels 20 and 22 is fixedly secured to a floor of a passenger compartment in any desired manner. A support brace 24 spans the side channels 20 and 22 and is fixedly secured to either the floor or the side channels 20 and 22 as desired. The support brace 24 can include a first extension 26 that extends beneath and wraps around a portion of the first side channel 20. An opposite second extension 28 extends beneath and wraps around a portion of the second side channel 22. When mounted in a vehicle, the lower track assembly 12, including the first and second side channels 20 and 22 and the support brace 24, is fixed and does not move.

The upper track assembly 14 provides a support surface for a seat assembly and slides relative to the lower track assembly 12. The upper track assembly includes a first rail 30 slidably received in the first side channel 20. A second rail 32 is slidably received in the second side channel 22. A first angle 34 having an L-shaped cross section is attached to the first rail 30 by any desired means. A second angle 36 having an L-shaped cross section is attached to the second rail 32 by any desired means. A first cross brace 37 spans and is attached between the first and second angles 34 and 36. A second cross brace 38 spans and is attached between the first and second angles 34 and 36. The second cross brace 38 is spaced from the first cross brace 37. The cross braces 37 and 38 are attached to the angles 34 and 36 by any desired means. Upper surfaces of the angles 34 and 36 and cross braces 37 and 38 form a support surface for a seat assembly which slides as the rails 30 and 32 slide together in their respective side channels 20 and 22.

A spring 40, preferably a coil spring, is attached between the lower track assembly 12 and the upper track assembly 14. A first end of the spring 40 can be attached to a tab 39 projecting from a lower surface of angle 36. A second end of the spring 40 can be attached to a tab 29 projecting from an upper surface of the second extension 28 of the cross support 24. The spring 40 provides a force that tends to urge the upper track assembly 14 toward a front end of the seat bottom frame assembly 10.

Figure 2:
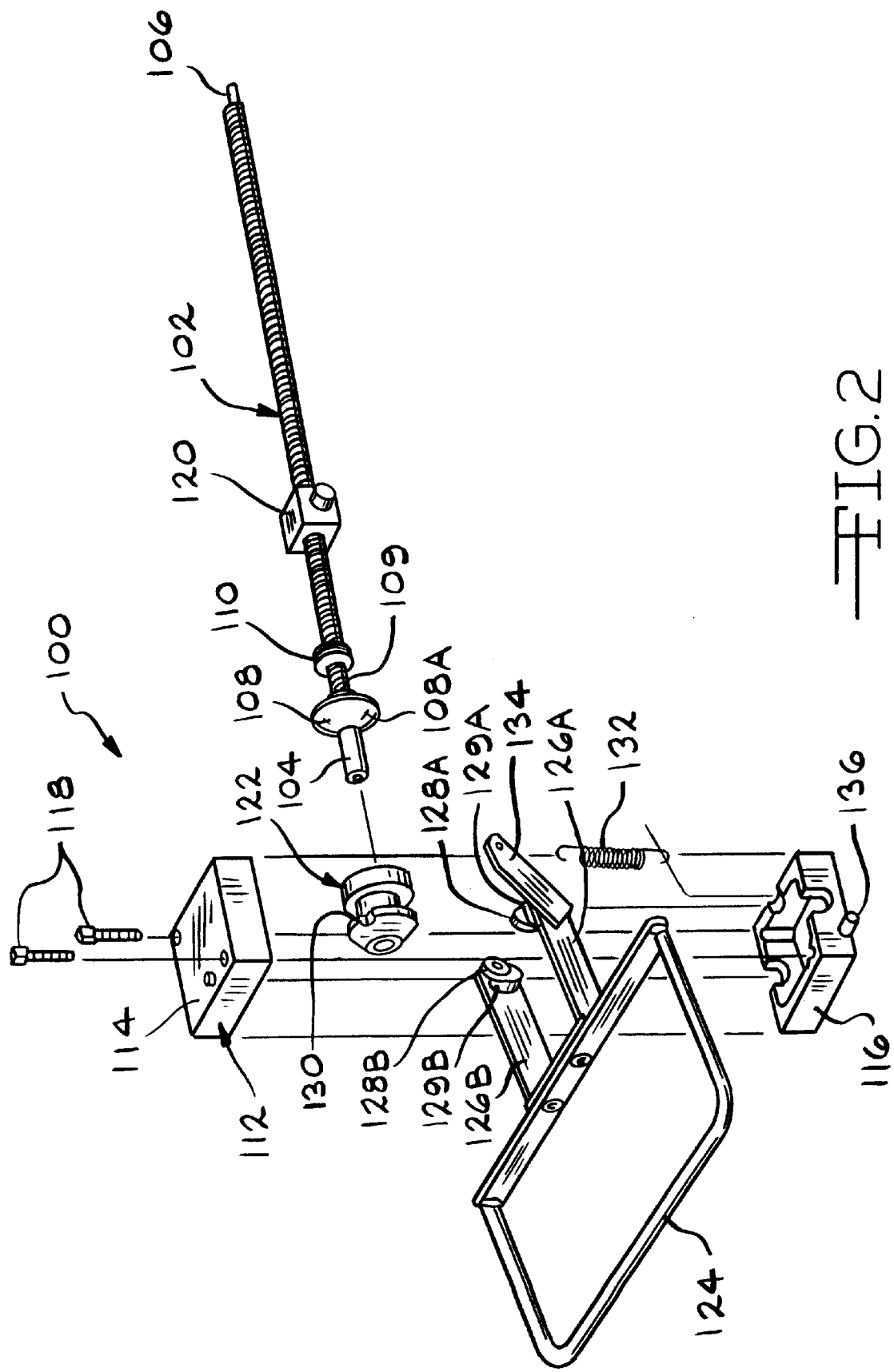

A first embodiment of a manually actuated seat adjuster according to this invention is indicated generally at 100 in FIGS. 1 and 2. The seat adjuster 100 is actuated manually by a user to adjust the position of the upper track assembly 14. In its free state, the seat adjuster 100 locks upper track assembly 14 so that no movement is permitted. When the seat adjuster 100 is actuated as described below, the upper track assembly 14 is positioned as desired as the rails 30 and 32 slide in their respective side channels 20 and 22.

The seat adjuster 100 includes a rotatable screw driveshaft 102 having a first end 104 and a second end 106. The second end 106 is rotatably supported by a bearing or the like (not illustrated) mounted on a lower surface of the second cross brace 38. The first end 104 is rotatably mounted in a housing 112. The housing 112 includes an upper portion 114 secured to a lower portion 116 by any desired means including fasteners 118. The upper portion 114 is attached to a lower surface of the first cross brace 37 by any desired means. A mid portion of the driveshaft 102 is received in a drive nut 120. The drive nut 120 is threadingly received in a bracket 121 mounted to an upper surface of the cross support 24.

A first element 108 illustrated as a clutch disc is fixedly secured to the first end 104 by any desired means and disposed inside the housing 112. A bushing 109 is mounted on the driveshaft 102 and placed between the clutch disc 108 and an inner surface of the housing 112. A thrust bearing 110 is mounted on the driveshaft 102 and placed at an outer surface of the housing 112. A second element 122 illustrated as pressure plate is rotatably disposed about and longitudinally displaceable along the first end 104 within the housing 112. Preferably, the pressure plate 122 includes an interior conical or tapered surface complementary to an outer conical or tapered surface 108A of the clutch disc 108.

When the pressure plate 122 is engaged with the clutch disc 108, i.e., when their complementary surfaces are pressed together, friction between the complementary surfaces prevents the clutch disc 108 and the attached driveshaft 102 from rotating. Thus, the position of the upper track assembly 14 and its supported seat assembly is maintained. When the pressure plate 122 is displaced away from the clutch disc 108, i.e., when their complementary surfaces are not pressed together, the driveshaft 102 is free to rotate inside drive nut 120 as the upper track assembly 14 is positioned as desired.

An actuation member or bar 124 is mounted on the housing 112 and operable with the pressure plate 122 for selectively positioning the pressure plate 122. A pair of arms 126A and 126B extend rearwardly from the actuation bar 124. A pair of cams 128A and 128B are provided on respective posts 129A and 129B extending inwardly from arms 126A and 126B. The cams 128A and 128B are received in an annular slot 130 formed about an outer surface of the pressure plate 122. A spring 132, preferably a coil spring, is connected between a finger 134 extending from arm 126A and a post 136 formed on the lower portion 116 of the housing 112. The spring 132 biases the actuation bar 124 upwardly as posts 129A and 129B pivot in respective openings formed in the housing 112.

In a free state, the spring 132 retains the actuation bar 124 in an upward position, thereby urging the pressure plate 122 against the clutch disc 108. Specifically, a force from the spring 132 urges the cams 128A and 128B against a rear wall of the slot 130 so that the pressure plate 122 is engaged with the clutch disc 108. Friction between the complementary surfaces of the pressure plate 122 and the disc plate 108 prevents rotation of the driveshaft 102. Thus the drive nut 120 cannot move along the driveshaft 102 and the upper track assembly 14 remains stationary with respect to the lower track assembly 12.

When movement of the upper track assembly 14 and a mounted seat assembly is desired, an operator pushes downwardly on the actuation bar 124. As the actuation bar 124 pivots about posts 129A and 129B, the pressure plate 122 is pulled away from the clutch disc 108. Specifically, the cams 128A and 128B seated in the slot 130 move the pressure plate 122 longitudinally along an axis of the driveshaft 102 to disengage the complementary surfaces of the pressure plate 122 and the clutch disc 108. At this point the driveshaft 102 is free to rotate. An operator provides sufficient force to the upper track assembly 14 or seat assembly to move the drive nut 120 along the driveshaft 102 as the upper track assembly 14 slides with respect to the lower track assembly 12. Once the operator has the seat assembly in a desired location, the actuation bar 124 is released, allowing the spring 132 to return the pressure plate 122 against the clutch disc 108. Specifically, the cams 128A and 128B move the pressure plate 122 along a longitudinal axis and return the pressure plate 122 against the clutch disc 108, preventing rotation of the driveshaft 102 and movement of the drive nut 120 and upper track assembly 14.

Figure 3:
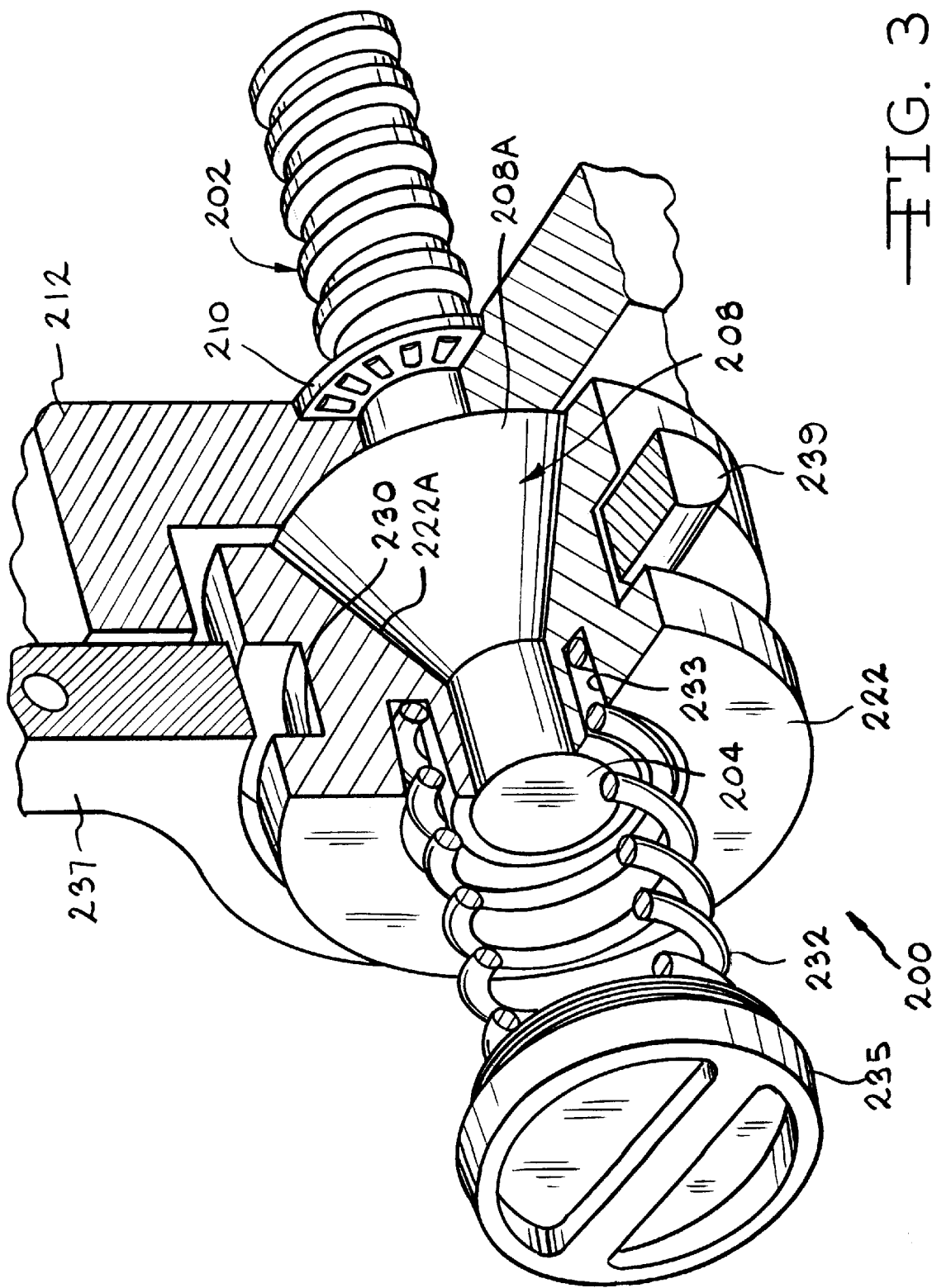

A second embodiment of a manually actuated seat adjuster according to this invention is indicated generally at 200 in FIG. 3. The seat adjuster 200 is particularly adapted for use with the seat bottom frame assembly 10 and its lower and upper track assemblies 12 and 14. The seat adjuster 200 includes a rotatably screw driveshaft 202 having a first end 204 and a second end (not illustrated). The second end is rotatably mounted in a bearing or the like (not illustrated) mounted on the second cross brace 38. A mid portion of the driveshaft 202 is rotatable support by a drive nut (not illustrated) similar to drive nut 120 of FIGS. 1 and 2. The first end 204 is rotatably mounted in a housing 212.

A clutch disc 208 is fixedly secured to the first end 204 by any suitable means so that the clutch disc 208 and driveshaft 202 rotate together. A thrust bearing 210 is mounted on the driveshaft 202 and received in a recess formed in an outer surface of the housing 212. A bushing (not illustrated) is mounted on the driveshaft 202 between the clutch disc 208 and an inner surface of the housing 212.

A pressure plate 222 is rotatably disposed about and longitudinally displaceable along the first end 204 within the housing 212. Preferably, the pressure plate 222 includes an interior conical or tapered surface 222A complementary to an outer conical or tapered surface 208A of the clutch disc 208. When the pressure plate 222 is engaged with the clutch disc 208, the driveshaft 202 does not rotate, and thus an attached seat assembly is locked in position. When the pressure plate 222 is disengaged from the clutch disc 208, the driveshaft 202 rotates within its drive nut so that a seat assembly can be positioned as desired.

An annular slot 230 is formed in an outer surface of the pressure plate 222. A spring 232, preferably a coil spring, is received at a first end in an annular seat 233 formed in a forward surface of the pressure plate 222. A second end of the spring 232 is received in an end cap 235. Preferably, the end cap 235 is threaded to an opening formed in the housing 212. The spring 232 provides a force to urge the pressure plate 222 into engagement with the clutch disc 208.

A yoke 237 is received in an opening formed in the housing 212. The yoke 237 includes a pair of opposed cams 239 (only one of which is illustrated) received in the slot 230. The yoke 237 can be attached to a bar or the like for the convenience of an operator.

When an operator desires to position a seat assembly, the seat adjuster 200 releases the pressure plate 222 from the clutch disc 208. An operator applies a sufficient force to the yoke 237 to disengage the pressure plate 222 from the clutch disc 208. Specifically, cams 239 urge the pressure plate 222 forward against the force of spring 232. At this point, the driveshaft 202 is free to rotate. When the seat assembly is at a desired location, the operator releases the yoke 237 and the force of spring 232 returns the pressure plate 222 against the clutch disc 208 to prevent rotation of the driveshaft 202.

A third embodiment of a manually actuated seat adjuster according to this invention is indicated generally at 300 in FIG. 4. The seat adjuster 300 is particularly adapted for use with the seat bottom frame assembly 10 and its lower and upper track assemblies 12 and 14. The seat adjuster 300 includes a rotatably screw driveshaft 302 having a first end 304 and a second end (not illustrated). The second end is rotatably mounted in a bearing or the like (not illustrated) mounted on the second cross brace 38. A mid portion of the driveshaft 302 is rotatably supported by a drive nut (not illustrated) similar to drive nut 120 of FIGS. 1 and 2. The first end 304 is rotatably mounted in a housing 312.

A pin housing 308 is fixedly secured to the first end 304 and positioned inside the housing 312. As illustrated in FIG. 4, a bolt 303 is threaded into a respective opening formed in an end surface of the first end 304. In this manner, the pin housing 308 and driveshaft 302 rotate together. If desired, a retainer plate 305 can be positioned between the bolt 303 and the pin housing 308. A washer 307 is provided between the bolt 303 and the retainer plate 305. A bushing 309 is mounted on the driveshaft 302 and seated in a recess provided at an inner surface of the housing 312. A thrust bearing 310 is mounted on the driveshaft 302 and seated in a recess provided at an outer surface of the housing 312.

The pin housing 308 includes at least one pin 311 extending from a surface of the pin housing 308 facing the first end 304. The pin 311 is slidably received in a respective seat 313 formed in the pin housing 308. A spring 315, preferably a coil spring, urges the pin 311 outwardly from the seat 313. In a preferred embodiment, the pin housing 308 includes a plurality of pins 311 spaced in a predetermined pattern 320 about the surface. The predetermined pattern 320 is illustrated in FIG. 5. The retainer plate 305 includes openings 316 corresponding to the predetermined pattern 320.

A throw-out cylinder 322 is rotatably disposed about and longitudinally displaceable along the first end 304 within the housing 312 forward of the retainer plate 305. The throw-out cylinder 322 includes a predetermined pattern of openings 324 formed on a surface 322A facing the pin housing 308. The openings 324 are radially spaced and sized to receive the pin 311. In a preferred embodiment, a pattern 326 illustrated in FIG. 6 is provided in the surface 322A. The predetermined patterns 320 and 326 are selected so that at least one pin 311 is always received in an opening 324 when the throw-out cylinder 322 is engaged with the pin housing 308.

When the throw-out cylinder 322 is engaged with the pin housing 308, i.e., a pin 311 is received in an opening 324, the pin housing 308 and driveshaft 302 do not rotate. Thus, an attached seat assembly is locked in position When the throw-out cylinder 322 is disengaged from the pin housing 308, i.e., no pins 311 are received in openings 324, the driveshaft 302 rotates within its drive nut so that a seat assembly can be positioned as desired.

An annular slot 330 is formed in an outer surface of the throw-out cylinder 322. A spring 332, preferably a coil spring, is received at a first end in an annular seat 333 formed in a forward surface of the throw-out cylinder 322. A second end of the spring is received in an end cap 335. Preferably, the end cap 335 is threaded to an opening 336 formed in the housing 312. The spring 332 provides a force to urge the throw-out cylinder 322 into engagement with the pin housing 308.

A yoke (not illustrated) is received in an opening formed in the housing 312. The yoke includes a pair of opposed cams 339 received in the slot 330. The yoke can be attached to a bar or the like for the convenience of an operator.

When an operator desires to position a seat assembly, the seat adjuster 300 releases the throw-out cylinder 322 from the pin housing 308. An operator applies a sufficient force to the yoke to disengage the throw-out cylinder 322 from the pin housing 308. Specifically, cams 339 urge the throw-out cylinder 322 forward against the force of spring 332. At this point, the driveshaft 302 is free to rotate. When the seat assembly is at a desired location, the operator releases the yoke and the force of spring 332 returns the throw-out cylinder 322 toward the pin housing 208 to receive at least one pin 311 and prevent rotation of the driveshaft 302.

Figure 7:
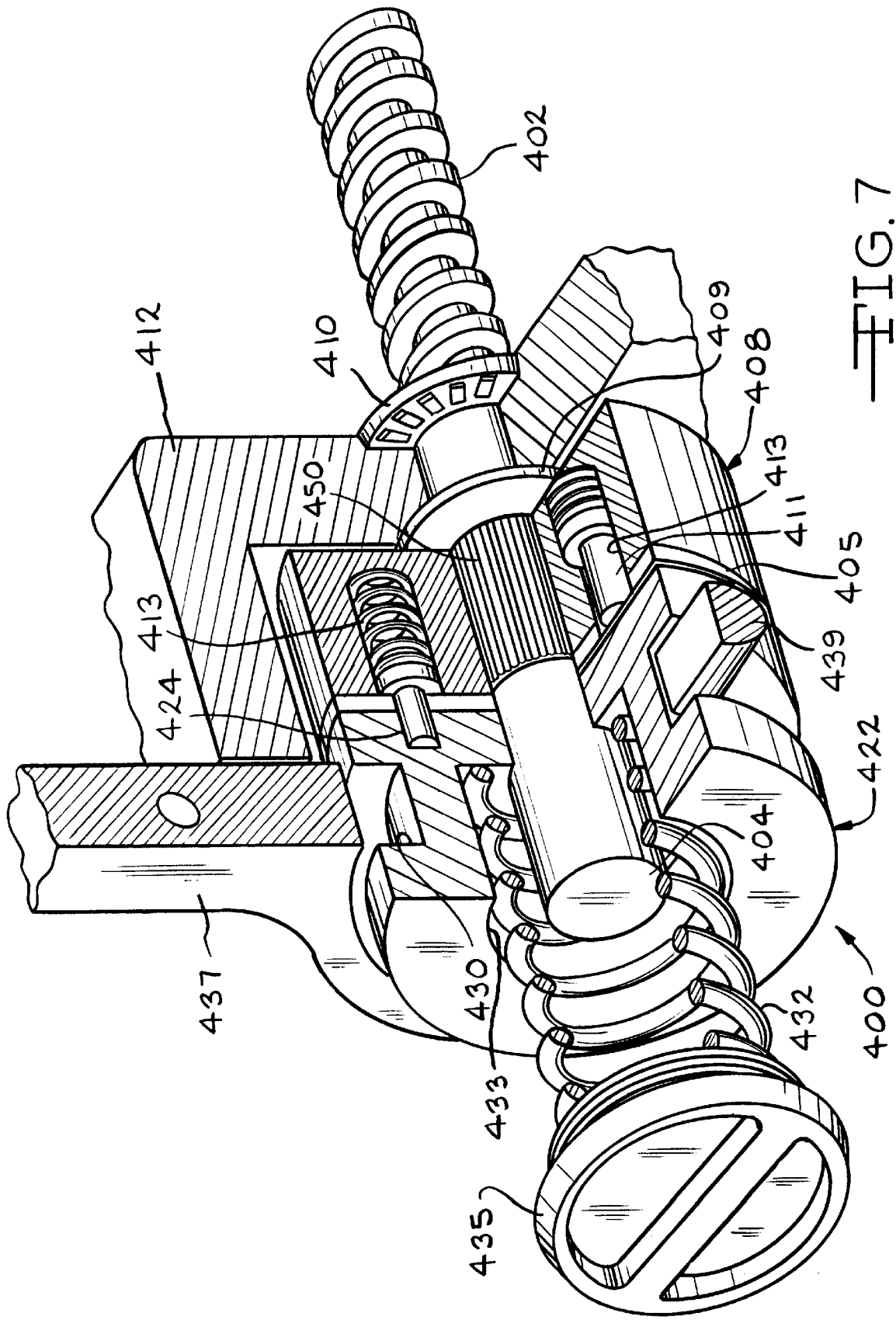

A fourth embodiment of a manually actuated seat adjuster according to this invention is indicated generally at 400 in FIG. 7. Seat adjuster 400 is similar to seat adjuster 300 and like elements have been indicated in the 400 series. Like seat adjuster 300, seat adjuster 400 includes elements such as a retainer plate 405, a bushing 409, a thrust bearing 410, a housing 412, a seat 413, a slot 430, a spring 432, a seat 433, a cap 435, and a cam 439. The seat adjuster 400 includes a pin housing 408 having a plurality of pins 411 receivable into openings 424 formed in a throw-out housing 422. Seat adjuster 400 differs from seat adjuster 300 in the manner in which the pin housing 408 is secured to a first end 404 of a driveshaft 402. As illustrated in FIG. 7, a keyed or splined portion 450 of the first end 404 is mated with complementary grooves formed along an inner circumference of the pin housing 408 so that the pin housing 408 and the driveshaft 402 rotate together. A yoke 437 is actuated to disengage the throw-out cylinder 422 from the pin housing 408 so that the driveshaft 402 and an attached seat assembly can be positioned as desired.

Figure 8:
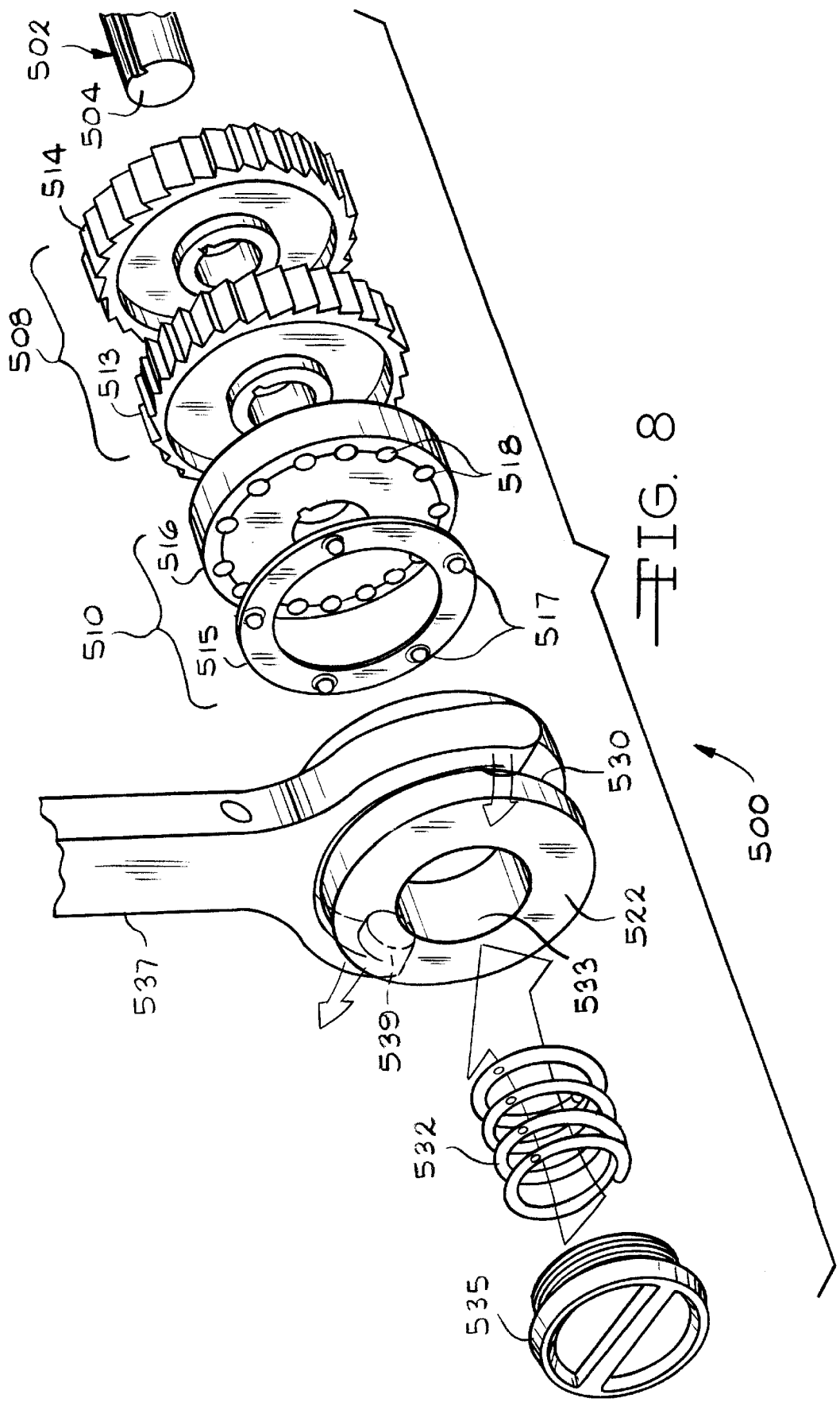
Figure 9:
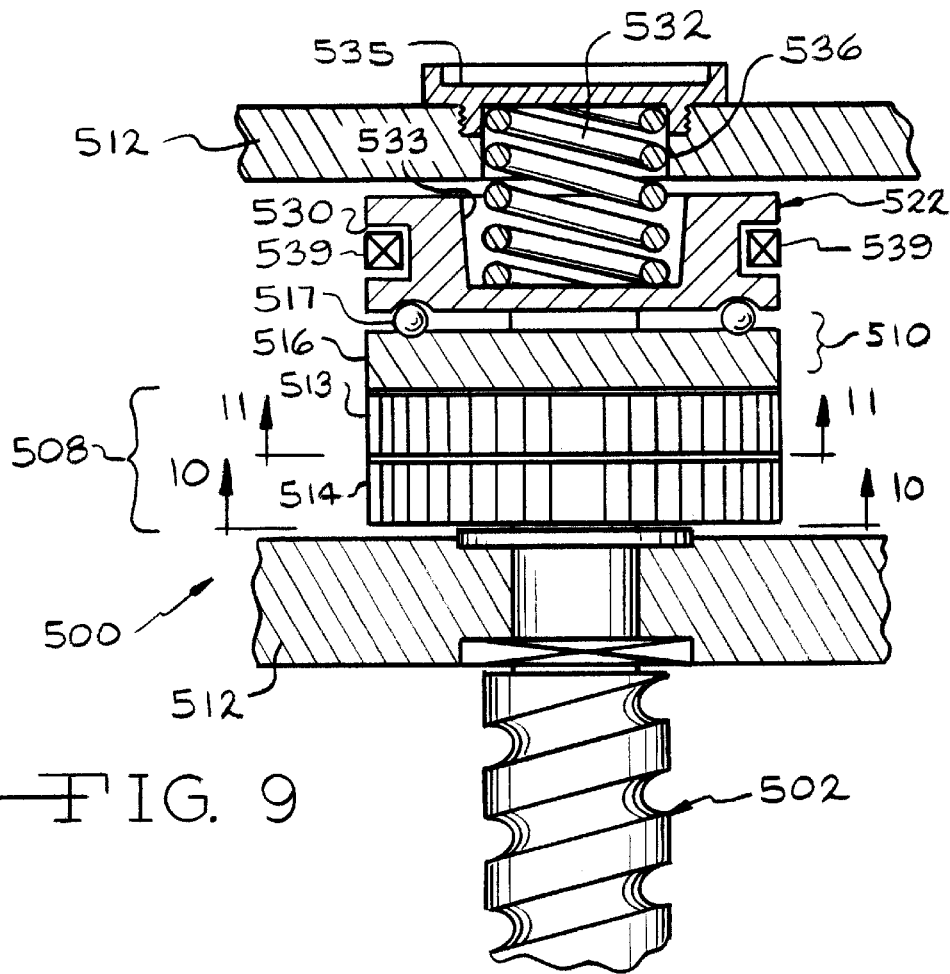

A fifth embodiment of a manually actuated seat adjuster according to this invention is indicated generally at 500 in FIGS. 8 and 9. The seat adjuster 500 is particularly adapted for use with the seat bottom frame assembly 10 and its lower and upper track assemblies 12 and 14. The seat adjuster 500 includes a rotatable screw driveshaft 502 having a first end 504 and a second end (not illustrated). The second end is rotatably mounted in a bearing or the like (not illustrated) mounted on the second cross brace 38. A mid-portion of the driveshaft 502 is rotatably supported by a drive nut (not illustrated) in a manner similar to drive nut 120 of FIGS. 1 and 2.

A gear set 508 and a bearing assembly 510 are fixedly secured about the first end 504 which is rotatably mounted in a housing 512. Preferably, the gear set 508 and the bearing assembly 510 are splined or keyed onto the driveshaft 502. The gear set 508 includes a clockwise gear 513 and a counterclockwise gear 514. Each gear 513 and 514 includes a pattern of aligned teeth formed on its outer circumference. The bearing assembly 510 includes a bearing plate 515 and a race 516. The bearing plate 515 carries bearing elements such as balls 517. The race 516 is fixedly secured to the first end 504, preferably by a spline or key. The race 516 includes a pattern of ball seats 518 formed in a surface facing the bearing plate 515.

Figure 10:
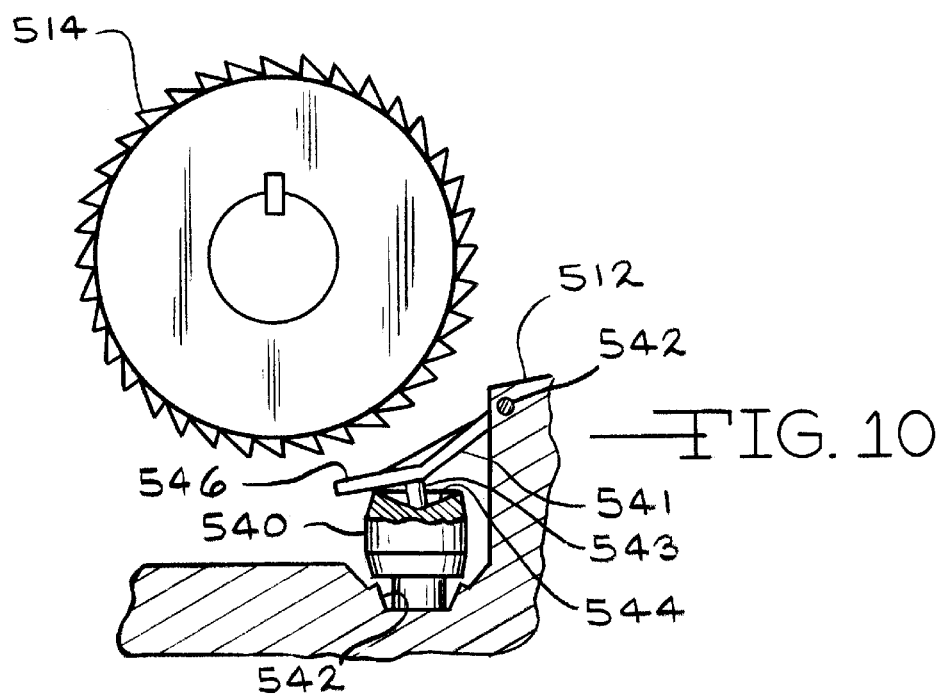
Figure 11:
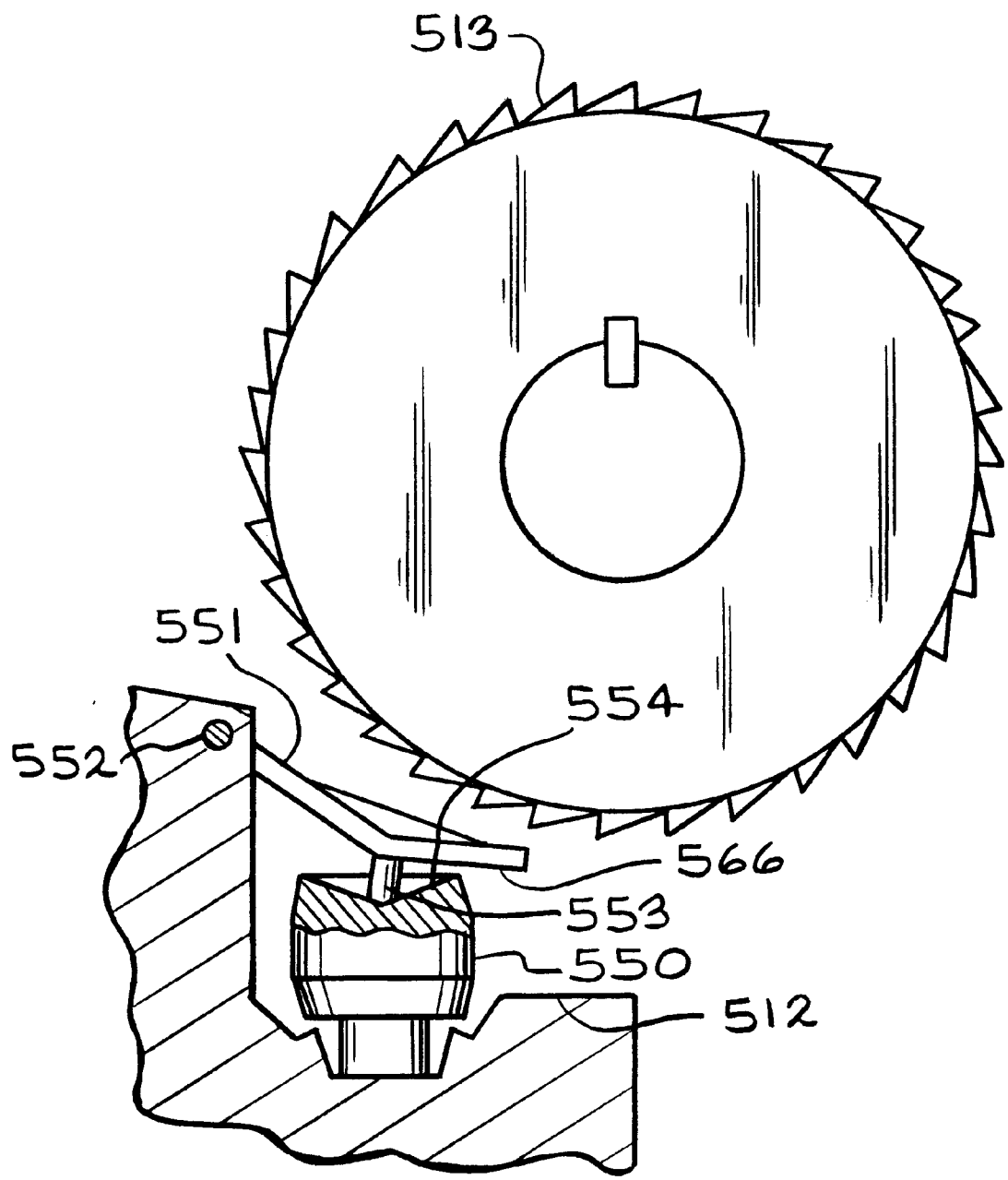
Figure 12:
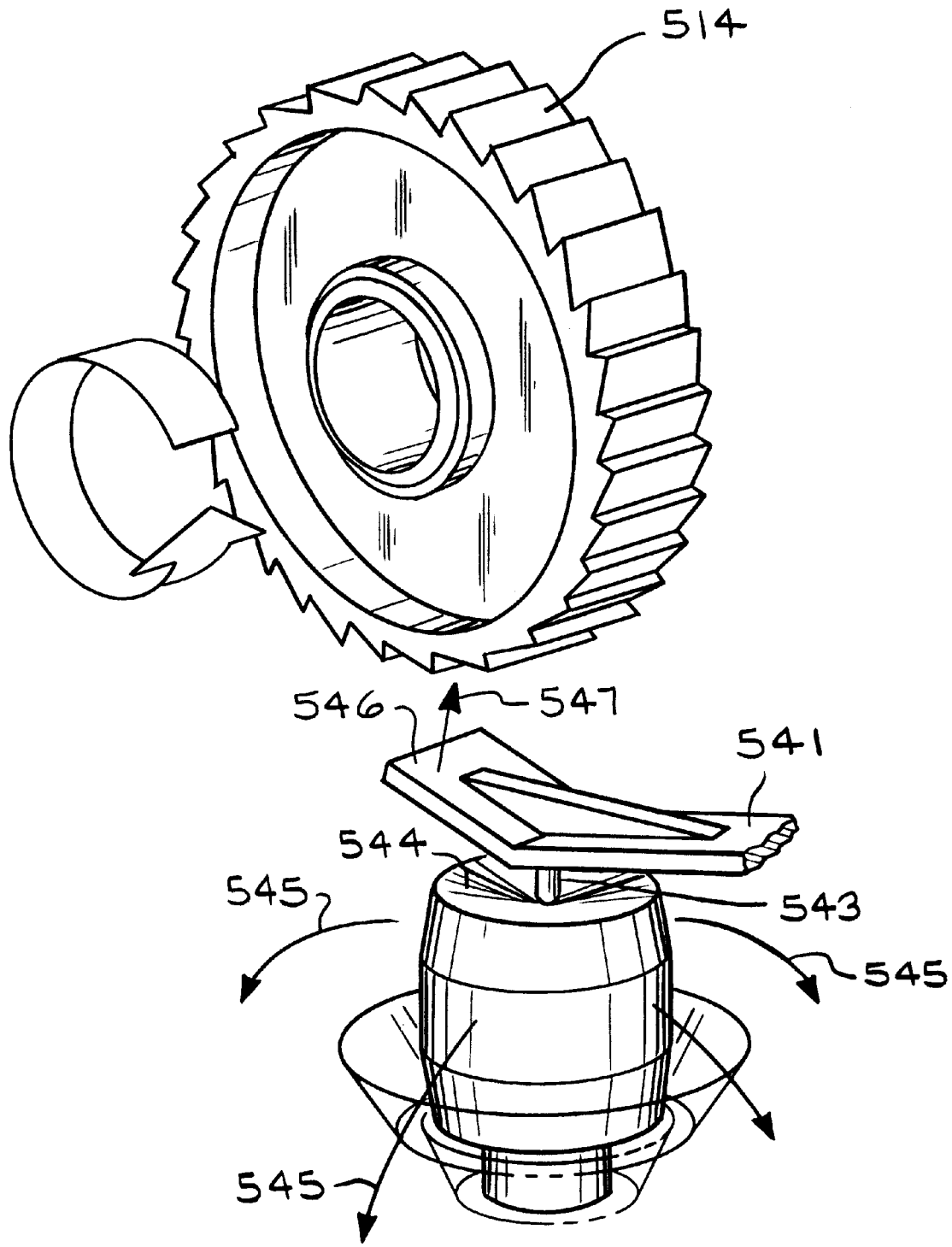

As illustrated in FIGS. 10 and 12, a counterweight 540 and a cooperating pivoting lever 541 are placed in the housing 512 adjacent the counterclockwise gear 514. The counterweight 540 is received in a seat 542 formed in the housing 512. The lever 541 is pivoted at pin 542 provided in the housing 512. The lever 541 includes a downwardly projecting support 543 received in a depression 544 formed in the counterweight 540. When the counterweight 540 is upright as shown in FIGS. 10 and 12, the lever 541 does not engage teeth formed on the counterclockwise gear 514. When the counterweight 540 tilts a predetermined amount (indicated schematically by arrows 545 in FIG. 12), an end 546 of the lever 541 engages a tooth (indicated schematically by arrow 547 in FIG. 11) to prevent rotation of the counterclockwise gear 514 and the attached screw driveshaft 502. Sudden acceleration of the vehicle can be one example of an event that will tilt the counterweight 540 to prevent rotation of the counterclockwise gear 514 and the attached driveshaft 502.

As illustrated in FIG. 11, a counterweight 550 and a cooperating pivoting lever 551 are placed in the housing 512 adjacent the clockwise gear 513. The counterweight 550 is received in a seat formed in the housing 512. The lever 551 is pivoted at pin provided in the housing 512. The lever 551 includes a downwardly projecting support 553 received in a depression 554 formed in the counterweight 550. When the counterweight 550 is upright as shown in FIG. 11, the lever 551 does not engage teeth formed on the clockwise gear 513. When the counterweight 550 tilts a predetermined amount, an end 556 of the lever 551 engages a tooth to prevent rotation of the clockwise gear 513 and the attached screw driveshaft 502.

A throw-out cylinder 522 is rotatably disposed about and longitudinally displaceable along the first end 504 within the housing 512. When the throw-out cylinder 522 is engaged with the bearing assembly 510, the balls 517 are seated in the ball seats 518, thus the driveshaft 502 does not rotate and an attached seat assembly is locked in position. When the throw-out cylinder 522 is disengaged from the bearing assembly 510, the balls 517 are no longer forced into the ball seats 518 so that driveshaft 502 rotates within its drive nut to position a seat assembly as desired.

An annular slot 530 is formed in an outer surface of the throw-out cylinder 522. A spring 532, preferably a coil spring, is received at a first end in an annular seat 533 formed in a forward surface of the throw-out cylinder 522. A second end of the spring is received in an end cap 535. The end cap 535 is threaded to an opening 536 formed in the housing 512. The spring 532 provides a force to urge the throw-out cylinder 522 into engagement with the gear set 508.

A yoke 537 is received in an opening formed in the housing 512. The yoke 537 includes a pair of opposed cams 539 that are received in the slot 530. The yoke 537 can be attached to a bar or the like for the convenience of an operator.

When an operator desires to position a seat assembly, the seat adjuster 500 releases the throw-out cylinder 522 from the gear set 508. An operator applies a sufficient force to the yoke 537 to disengage the throw-out cylinder 522 from the bearing assembly 510. Specifically, cams 539 urge the throw-out cylinder 522 forward against the force of spring 532. At this point, the driveshaft 502 is free to rotate, so long as the counterweights 540 and 550 are upright. When the seat assembly is at a desired location, the operator releases the yoke 537 and the force of spring 532 returns the throw-out cylinder 522 toward the bearing assembly 510. If at least one of the counterweights 540 and 550 is titled a predetermined amount so that a respective lever 541 and 542 is engaged, the driveshaft 502 does not rotate.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A manually actuated seat adjuster comprising:
   a rotatable driveshaft having first and second ends;
   a drive nut threadingly engaged with the driveshaft between the first and second ends;
   a first element fixedly secured to the first end of the driveshaft;
   a second element rotatably mounted on the first end of the driveshaft and selectively engaged with the first element; and
   an actuation member operatively connected to the second element to selectively engage the second element with the first element to prevent rotation of the driveshaft and to selectively disengage the second element from the first element to permit rotation of the driveshaft within the drive nut, wherein the first element includes a conical surface engageable with a complementary conical surface of the second element.

2. The manually actuated seat adjuster defined in claim 1 wherein the first element is a clutch disc and the second element is a pressure plate.

3. The manually actuated seat adjuster defined in claim 2 wherein a spring urges the pressure plate into engagement with the clutch disc to prevent rotation of the driveshaft.

4. The manually actuated seat adjuster defined in claim 3 wherein the spring is connected to the actuation member.

5. The manually actuated seat adjuster defined in claim 1 wherein the actuation member is a bar having cam means engaged with the second element.

6. A seat bottom frame assembly providing a support surface for a vehicular seat, comprising:
- a first track assembly fixedly secured to a floor of a passenger compartment;
- a second track assembly slidingly connected to the first track assembly; and
- a manually actuated seat adjuster attached to the first and second track assemblies to permit selective sliding of the second track assembly with respect to the first track assembly, the manually actuated seat adjuster including
  - a rotatable driveshaft having first and second ends, wherein the first and second ends are rotatable supported on cross braces of the second track assembly;
  - a drive nut threadingly engaged with the driveshaft between the first and second ends;
  - a first element fixedly secured to the first end of the driveshaft;
  - a second element rotatably mounted on the first end of the driveshaft and selectively engaged with the first element; and
  - an actuation member operatively connected to the second element to selectively engage the second element with the first element to prevent rotation of the driveshaft and to selectively disengage the second element from the first element to permit rotation of the driveshaft within the drive nut.

7. The seat bottom frame assembly defined in claim 6 wherein the first track assembly includes a pair of parallel channels and the second track assembly includes a pair of rails slidably received in the channels.

8. The seat bottom frame assembly defined in claim 6 wherein the drive nut is rotatably supported on a support brace of the first track assembly.

9. The seat bottom frame assembly defined in claim 6 including a spring connected between the first and second track assemblies.

10. The seat bottom frame assembly defined in claim 6 wherein the first element includes a surface complementary to and engageable with a surface of the second element.

11. The seat bottom frame assembly defined in claim 10 wherein the first element includes a conical surface engageable with a complementary conical surface of the second element.

12. The seat bottom frame assembly defined in claim 11 wherein the first element is a clutch disc and the second element is a pressure plate.

13. A seat bottom frame assembly providing a support surface for a vehicular seat, comprising:
- a first track assembly fixedly secured to a floor of a passenger compartment;
- a second track assembly slidingly connected to the first track assembly;
- a spring connected between the first and second track assemblies; and
- a manually actuated seat adjuster attached to the first and second track assemblies to permit selective sliding of the second track assembly with respect to the first track assembly, the manually actuated seat adjuster including
  - a rotatable driveshaft having first and second ends;
  - a drive nut threadingly engaged with the driveshaft between the first and second ends;
  - a first element fixedly secured to the first end of the driveshaft;
  - a second element rotatably mounted on the first end of the driveshaft and selectively engaged with the first element; and
  - an actuation member operatively connected to the second element to selectively engage the second element with the first element to prevent rotation of the driveshaft and to selectively disengage the second element from the first element to permit rotation of the driveshaft within the drive nut.

14. The seat bottom frame assembly defined in claim 13 wherein the first element includes a surface complementary to and engageable with a surface of the second element.

15. The seat bottom frame assembly defined in claim 14 wherein the first element includes a conical surface engageable with a complementary conical surface of the second element.

16. The seat bottom frame assembly defined in claim 13 wherein the first element is a clutch disc and the second element is a pressure plate.

* * * * *